United States Patent [19]
Phelps

[11] Patent Number: 5,562,797
[45] Date of Patent: Oct. 8, 1996

[54] METHOD AND APPARATUS FOR PRODUCING TRIM PANELS

[75] Inventor: Richard A. Phelps, Ferndale, Mich.

[73] Assignee: Becker Group, Inc., Warren, Mich.

[21] Appl. No.: 262,864

[22] Filed: Jun. 21, 1994

Related U.S. Application Data

[62] Division of Ser. No. 4,551, Jan. 14, 1993, Pat. No. 5,326,417.

[51] Int. Cl.$^6$ ................................................. B32B 31/00
[52] U.S. Cl. .................. 156/510; 156/583.1; 160/391; 428/161; 428/163
[58] Field of Search .............................. 52/222, 273, 811, 52/813; 160/391; 296/70; 428/161, 162, 163, 167; 156/510, 583.1

[56] References Cited

U.S. PATENT DOCUMENTS

| | | | |
|---|---|---|---|
| 2,744,564 | 5/1956 | Woodburn | 154/41 |
| 3,389,043 | 6/1968 | Clark | 428/161 X |
| 3,647,587 | 3/1972 | MacDonald | 156/71 |
| 3,816,234 | 6/1974 | Winfield | 161/160 |
| 4,020,207 | 4/1977 | Alfter et al. | 428/138 |
| 4,116,893 | 9/1978 | Flanagan | 521/137 |
| 4,134,610 | 1/1979 | Lindewall | 293/71 R |
| 4,214,788 | 7/1980 | Srock | 296/39 R |
| 4,288,490 | 9/1981 | Alfter et al. | 428/315 |
| 4,292,363 | 9/1981 | Briggs | 428/247 |
| 4,411,944 | 10/1983 | Moore | 428/172 |
| 4,432,580 | 2/1984 | Lohmar et al. | 269/39 A |
| 4,446,185 | 5/1984 | Waragai et al. | 428/67 |
| 4,663,210 | 5/1987 | Schreiber et al. | 428/160 |
| 4,695,501 | 9/1987 | Robinson | 428/159 |
| 4,758,299 | 7/1988 | Burke | 156/313 |
| 4,779,390 | 10/1988 | Repper et al. | 52/222 |
| 4,791,019 | 12/1988 | Ohta et al. | 428/304.4 |
| 4,804,425 | 2/1989 | Hoffmann et al. | 156/73.6 |
| 4,826,552 | 5/1989 | Breitscheidel et al. | 156/221 |
| 4,851,070 | 7/1989 | Shimada | 156/214 X |
| 4,919,470 | 4/1990 | Muller | 296/153 |
| 4,923,542 | 5/1990 | Janicki et al. | 156/92 |
| 4,987,156 | 1/1991 | Tozune et al. | 521/99 |
| 4,996,090 | 2/1991 | Steinke et al. | 428/71 |
| 5,073,429 | 12/1991 | Steinke et al. | 428/71 |
| 5,080,749 | 1/1992 | Moriya et al. | 156/382 |
| 5,091,031 | 2/1992 | Strappazzini | 156/211 |
| 5,098,124 | 3/1992 | Breed et al. | 280/751 |
| 5,106,137 | 4/1992 | Curtis | 293/107 |
| 5,178,927 | 1/1993 | Turner | 428/71 |
| 5,200,252 | 4/1993 | Kelman | 428/159 |
| 5,236,534 | 8/1993 | Noguti et al. | 156/245 |
| 5,296,068 | 3/1994 | Turner | 156/228 |

*Primary Examiner*—David A. Simmons
*Assistant Examiner*—Paul M. Rivard
*Attorney, Agent, or Firm*—Maxwell J. Petersen; Brinks Hofer Gilson & Lione

[57] ABSTRACT

To form a seam of attractive appearance, a heated platen having a shaped lip acts to engage and press the central surface of an adhesively-backed sheet of a polymeric fabric against the top appearance surface of a panel and the peripheral edge of the sheet into a groove formed in the surface, the platen activating the adhesive and the lip forcing a potion of the adhesive inwardly adjacent to the sheet edge against one wall of the groove. An insertion blade presses a portion of the sheet edge towards the bottom of the groove, the blade acting as a heat shield to space and protect the other wall of the groove from the heated platen.

8 Claims, 3 Drawing Sheets

METHOD AND APPARATUS FOR PRODUCING TRIM PANELS

This is a division of U.S. patent application Ser. No. 08/004,551, filed Jan. 14, 1993, now U.S. Pat. No. 5,326,417.

BACKGROUND OF THE INVENTION

This invention relates to an upholstered panel, such as for the interior of an automobile, and more particularly, to an improved method and apparatus for making such panels in which a sheet of polymeric fabric is adhered to the appearance surface of a unitary panel and its edge joined to a groove of the panel to form a seam of attractive appearance. Two or more sheets of similar or different material can also be used to cover contiguous surface areas of such unitary panel, their edges being joined to the groove to form an attractive seam.

Linings to cover otherwise unattractive surfaces of panels are well-known and are in common usage in the building trade, in general, and in the automotive industry, such as for use in trim panels for lining the interior of automobiles. Trim panels for vehicles typically include a relatively rigid support base having a contoured appearance surface which is covered by one or more sheets of thin material, such as a polymeric fabric, leather or vinyl. In these assemblies, it is important that the edges of the sheet, where joined to the panel, be attractive.

Generally, these assemblies can be made by injection molding a substrate panel directly onto the sheet or preforming the panel and joining the sheet material to the panel. Illustrative of the former approach is the trim panel disclosed in Strapazzini U.S. Pat. No. 5,091,031. Although the edges of the sheet material are joined first, this is a labor intensive step. The injection molding process has a disadvantage of requiring expensive mold apparatus.

Illustrative of the latter approach is the method disclosed in Repper et al. U.S. Pat. No. 4,779,390 wherein a unitary preformed panel is partitioned into contiguous first and second surface areas by a groove penetrating into the surface and the two surface areas successively covered by sheet material. In the method, the first surface area is masked while adhesive is sprayed onto the second surface area, a first sheet is positioned over the entire surface of the panel and the portion covering the first surface area trimmed away, and a second sheet is adhered to the second surface area. The second sheet is adhered to the panel, either by adhesive sprayed onto or provided on the back of the sheet, and the sheet edge is tucked into the groove.

According to one aspect of this method, since no heat treatment is necessary, it is very important that the combined width of the sheet edges exceed the width of the groove whereby to provide a tight joint. Although the trim panel so formed may provide an acceptable product, the steps of covering the first part of the panel surface, spraying adhesive onto the second part of the surface, waiting for the adhesive to dry, cutting the unwanted sheet portion from the second part without cutting the panel, and joining the second sheet to the panel appears to be costly, either as being labor intensive or in the time involved between steps. The automotive industry is always looking for ways to produce a cost-effective and attractive package.

Accordingly, it is therefore an object of the invention to provide a novel interior lining for automobiles, comprising different sheet materials.

A further object of the invention resides in the provision of novel means for thermal bonding a lining to a substrate, using different sheet materials, in an economical and attractive manner.

It is yet another object of the invention to provide an interior trim panel comprising a unitary foundation panel having contiguous surface areas and a sheet of limp material bonded to at least one of the surface areas.

A further object of the invention is to provide an interior lining of different sheet material for automotive vehicles which are joined by a seam of attractive appearance.

A still further object of this invention is provision of an interior lining having an attractive seam wherein the edge portion of the sheet material forming the seam is retained in a receiving groove, or on a contoured surface of the panel extending between surface areas of the panel, solely by adhesive.

According to the present invention, there is provided a method and apparatus for making a vehicle body door upholstery panel, the method including the steps of providing a unitary foundation panel including at least two contiguous surface areas partitioned by a groove penetrating into the panel to a predetermined depth, adhering an adhesive-backed surface of a sheet of upholstery cover material to one surface area of the panel, pressing a heated platen against the sheet to cause the adhesive to become tacky and adhere to the one surface area, the platen having a peripheral lip to force a portion of the sheet against the wall of the sheet, and while the platen is pressed against the sheet driving an insertion blade downwardly and into the groove to force the marginal edge portion of the sheet material into the groove, and holding the platen against the sheet and insertion of the blade in the groove for a sufficient period of time, the blade forming an air barrier to shield the sheet material on the panel from the heated platen.

Further objects, advantages and features of the present invention will become more fully apparent from the detailed consideration of the arrangement and construction of the constituent parts as set forth in the following description taken together with the accompanying drawings.

DETAILED DESCRIPTION OF THE PREFERRED EMBODIMENT

Turning now to the drawings, FIGS. 1–7 illustrate a method and apparatus for assembly of an interior trim panel for an automobile. Although the trim panel described herein is intended for use with a vehicle door (not shown), it is to be understood that such description is exemplary and could be employed in other applications requiring securement of sheet material to a support base and the edge of the sheet where joined to the base presenting a seam of attractive appearance.

According to this invention, FIGS. 1–4 depict an apparatus 10 for fabricating a trim panel 12. The trim panel 12 comprises a generally planar unitary member 14 having contoured top and bottom surfaces 16 and 18, the top surface 16 being the appearance surface and partitioned into two contiguous surface areas 20 and 22 by a preferably preformed continuous upwardly-open groove 24, the surface area 20 encircling the surface area 22. The groove 24 is generally oval in plan, U-shaped in cross-section, and includes a pair of vertical walls 26 and 28 and a well 30, the vertical walls 26 and 28, respectively, forming a smooth transition with the surface areas 20 and 22. It is to be understood that in some applications a generally linear groove will be used to separate the top surface into contiguous surface areas.

The panel member 14 may be made of a rigid material, such as fibrous press board and the like and the surface covered by a sheet of limp material, such as polyvinyl chloride, polymeric fabric or leather, all of the kind well known in the art. In the embodiment illustrated, the panel is laminated and includes a bottom layer 32 of glass reinforced urethane, an intermediate layer 34 of polypropylene foam, and a top sheet 36 of vinyl, the sheet 36 forming the top surface 16.

According to this invention a thin sheet of limp material is adapted to be secured to the surface area 22. Preferably the sheet is comprised of a polymeric fabric, such as exemplified by nylon and polypropylene or a wool/cotton, and one surface thereof is pre-coated with a suitable heat activatable adhesive which is ordinarily non-tacky in use. Although known to those in the art, suitable adhesives are Product Number HC 7675, available from PPG, Hughes Chemical Division, and Product Number 2895, available from Worthen, Upaco Adhesive Division.

Figure 1:
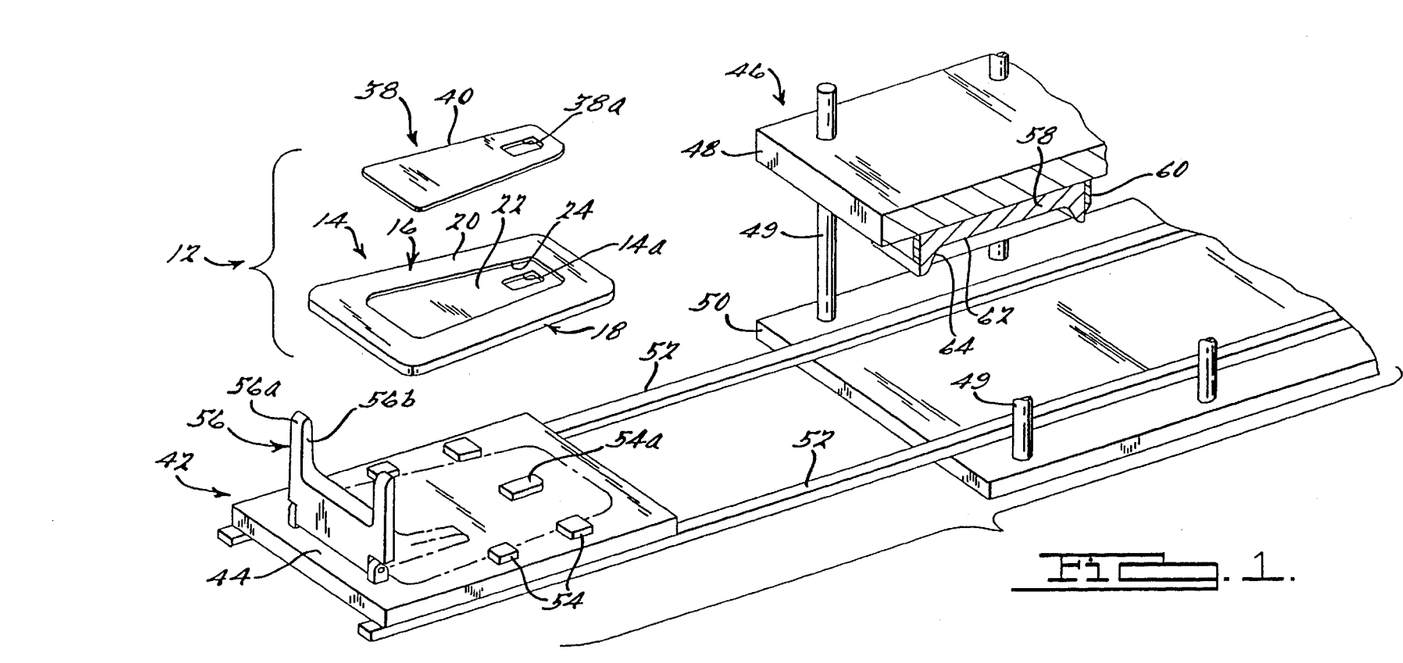
FIG. 1 is a fragmentary cross-section view in perspective, according to the present invention, of a method of adhering a sheet of fabric to a trim panel, such as for use in the interior of an automobile vehicle.
Figure 2:
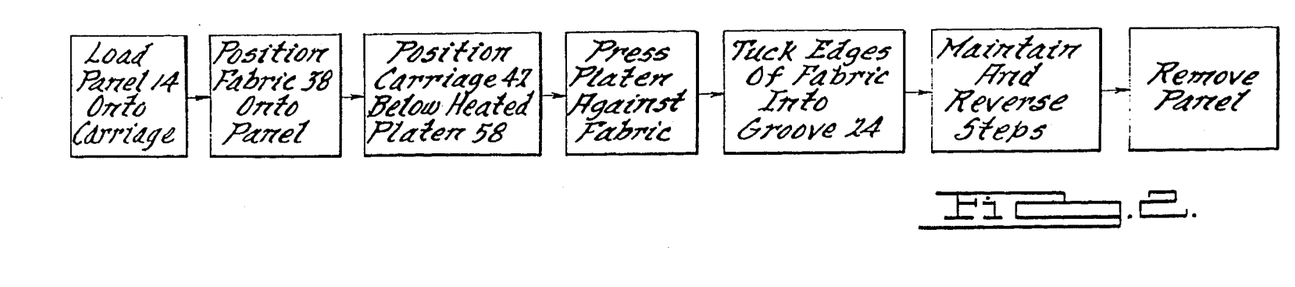
FIG. 2 indicates the steps of the method for forming the trim panel according to this invention.
Figure 3:
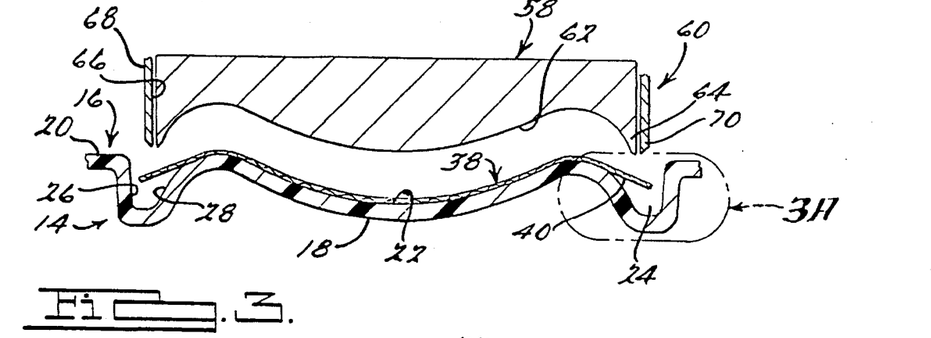
FIGS. 3 and 3A show in cross-section the sheet of fabric positioned on the trim panel and detail of the sheet edge relative to a groove formed in the panel.
Figure 3A:
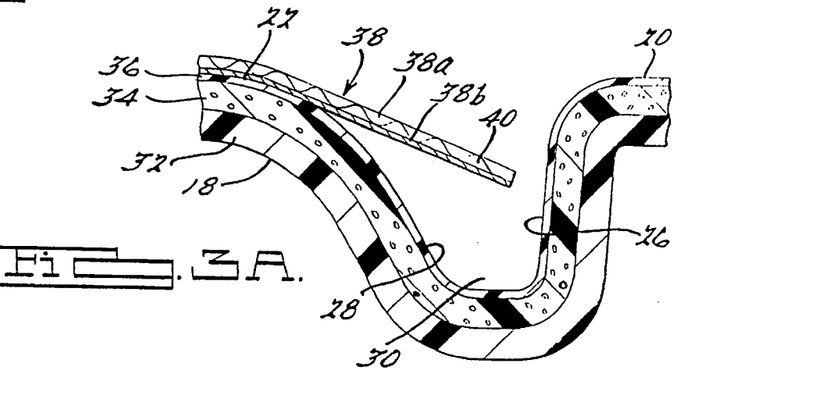
Figures 4, 4A:
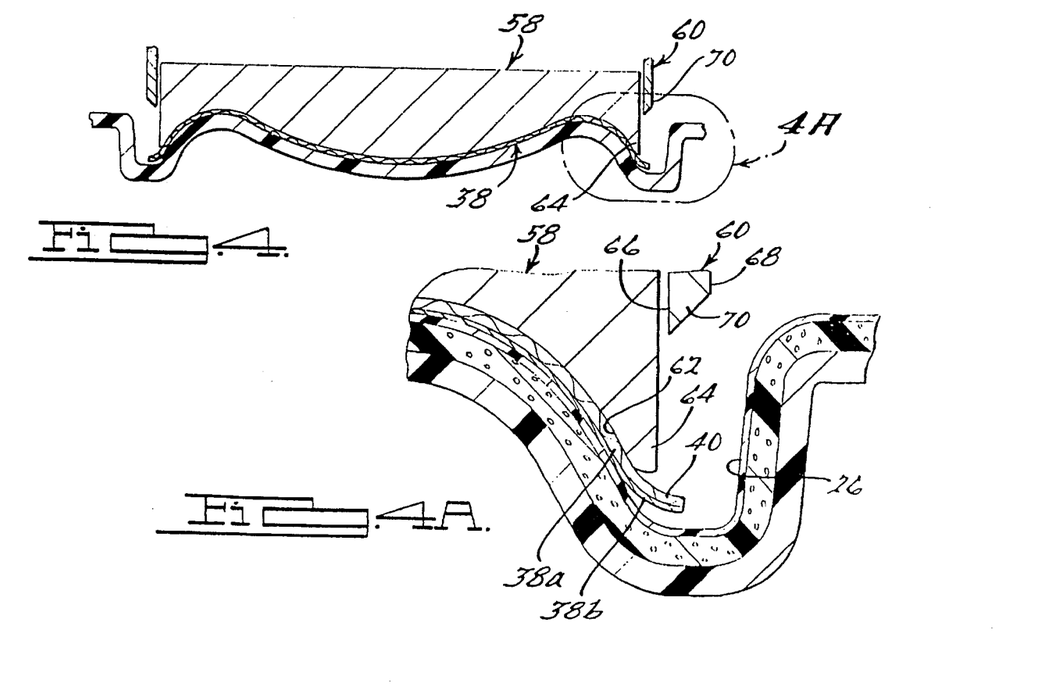
FIGS. 4 and 4A show in cross-section, a heated platen pressing the fabric against the panel.

The sheet is pre-cut into a desired shape, represented in FIG. 1 by the number 38, the sheet conforming to the shape of the groove and having a free edge 40 adapted to be inserted into the groove. As shown best in FIG. 3A, the sheet material is represented at 38a and the adhesive on the back of the sheet is represented at 38b.

The apparatus 10 includes a carriage 42 having an upper surface 44 for supporting the panel member 14, a vertical press 46 having upper and lower heads 48 and 50 connected by a set of vertical tie rods 49, and a guide track 52 for guiding the carriage from a first position spaced from the press and into a second position between the heads of the press. The carriage 42 has a plurality of locators 54 arranged on the upper surface 44 to engage the edge of the panel whereby to position the trim panel relative to the carriage. In the carriage shown, a central locator 54a is provided to receive the cutout 14a formed in the panel, such as would be needed for a door handle. In this regard, the sheet 38 would have a cutout 38c corresponding to the shape of the locator 54a. According to a feature of this invention, a U-shaped locator clamp 56 is hingedly mounted to the carriage and is adapted to assist in securing the panel member 14 to the carriage and positioning part of the free edge 40 of the sheet 38 in overlapping relation to a respective portion of the groove. The locator clamp 56 includes a pair of arms 56a having forwardly angled surfaces 56b positionable adjacent to the groove to guide the edge of the sheet into position next to the groove.

According to this invention, a platen 58 and an insertion blade 60 are connected to the upper head 48, each being adapted to be lowered into engagement with the sheet. The platen 58 has a surface 62 conforming to and adapted to press the sheet 38 against the surface area 22 of the panel member 14 and an outer periphery in the form of a preferably continuous lip 64 which conforms to the shape and cross-section of the groove 24, the lip being dimensioned to extend partially into the groove and press a portion of the sheet edge 40 against the surface of the vertical wall 28. The platen is adapted to be heated, such as by internal heater coils (not shown), whereby to activate the adhesive and adhere the sheet to the panel. Importantly, the lip assures that part of the adhesive on the sheet and inwardly of the groove is activated whereby the sheet edge is held in the groove solely by an adhesive bond.

The insertion blade 60 is mounted for vertical movement relative to the platen whereby to invade the groove to force the free edge portion of the sheet 38 downwardly into the groove 24. The insertion blade 60 is preferably continuous, conforms to the shape of the groove 24, and has inwardly and outwardly facing sides 66 and 68 and a forward end 70, the side 66 being spaced from the outer periphery of the platen 58 by an air gap 67 and the side 68 being spaced from the vertical wall 26 by an air gap 69. The forward end 70 is adapted to force the sheet edge and free end portion of the sheet into the well of the groove.

An important feature of the insertion blade is its use both in preventing the edge of the sheet from curling up and possibly misadhering to the other vertical wall 38 and also as a heat shield. During the heating of the sheet and the adhesive, in higher temperature applications, it is possible that the heated platen could adversely effect the surface area 20 formed by the vinyl 36. The blade 60 shields the vinyl from the platen heat, conducts heat directly from the platen and adhesive bond, and forms the vertical air barrier 69 between the blade side 68 and the vertical wall 28 whereby to inhibit transfer of heat thereagainst.

Provided with the apparatus 10 is a driver to drive and hold the heated platen 58 and the blade 60 against the panel and the sheet, a mover to move the carriage to and from the platen, and an electronic control for controlling the operation of the apparatus, including a timer for controlling the duration the platen is pressed against the sheet, the temperature of the platen, the sequence by which the carriage is positioned relative to the press, and the sequence by which the platen and the blade are positioned about the carriage and the sheet. Although not shown, these elements are conventional and understood by one skilled in the art.

In operation, the heat activatable adhesive is roll-coated to one side of the sheet and the sheet cut into the desired shape. The panel member 14 is positioned on the carriage 42 by the locators 54, 54a and 56 and thereafter the adhesive side 38b of the sheet 38 is positioned on the panel 14. The locator clamp 56 is rotated downwardly onto the top surface 20 of the panel to clamp the panel to the carriage and the sheet 38 is lowered into position on the surface 22, the opening 38c fitting about the locator 54a and the sheet edge fitted within the arms 56a. The carriage is moved via the track 52 under the upper head 48 and into position vertically below the platen 58 and blade 60.

The platen 58 is preheated to a desired temperature, depending on the fabric, the thickness of the sheet; and the adhesive to be heated, and lowered vertically onto the top of the sheet, pressing the platen surface 62 against the sheet 38 and pressing the sheet against the panel 14. As shown best in FIGS. 4 and 4A, the lip 64 invades into the groove 24 and forces a marginal edge portion of the sheet edge against the groove wall and the free edge 40 into the groove 24. Only the adhesive on the portion of the sheet engaged by surface 62 and the lip 64 is activated to adhere the sheet to the groove wall. That is, the platen does not activate the adhesive portion on the sheet from that part of the sheet engaged by the lip to the free edge of the sheet.

Figure 5:
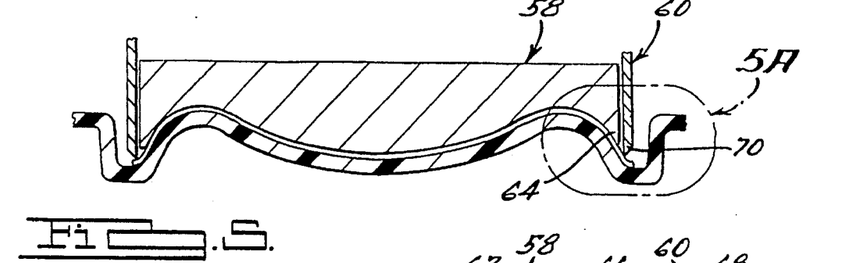
FIGS. 5 and 5A show, in cross-section, the heated platen being maintained against the sheet and a tucking tool stuffing the edge of the sheet into the groove.
Figures 5A, 6, 7, 7A:
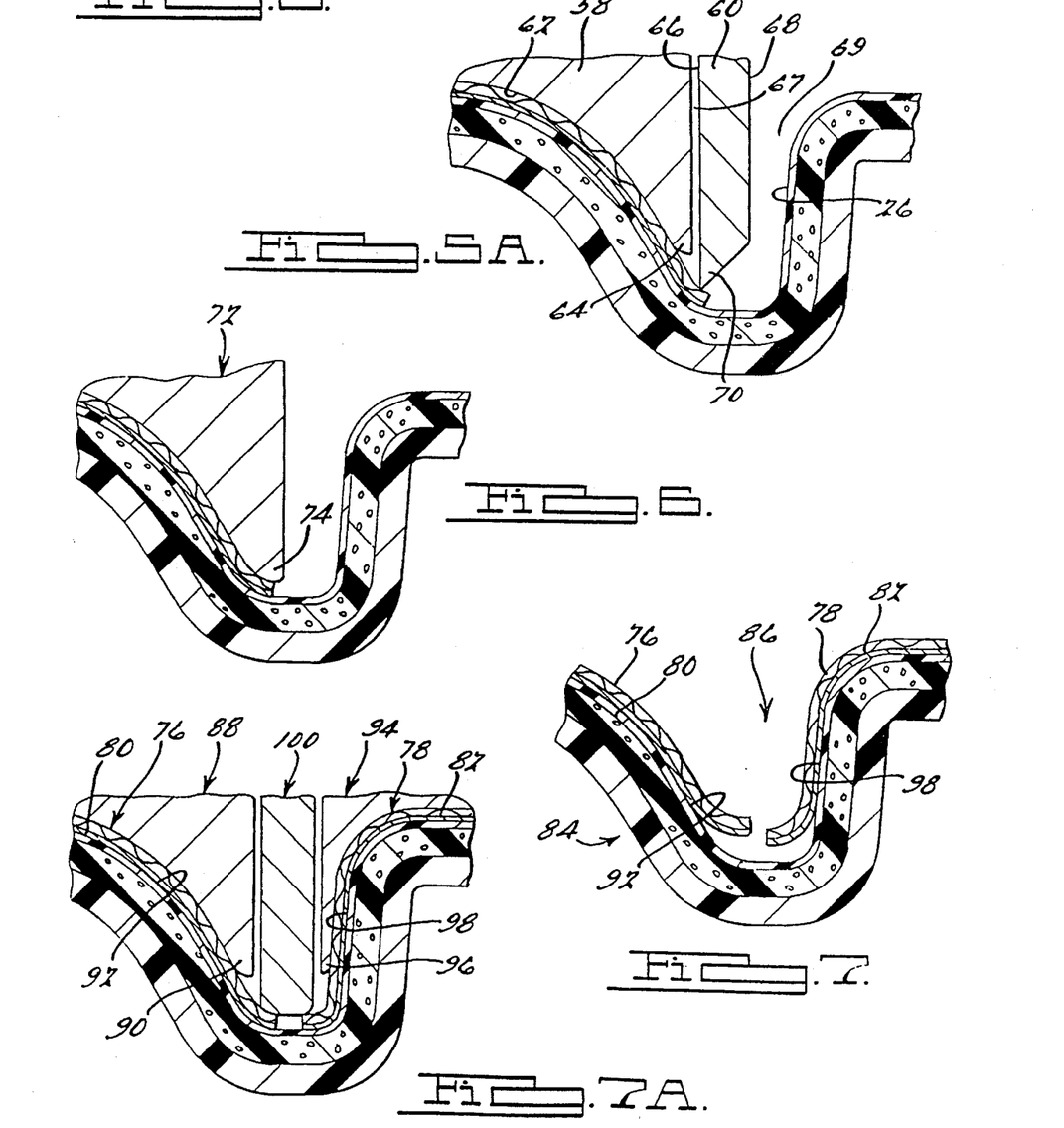
FIG. 6 is a cross-section view showing an alternate embodiment wherein the heated platen alone is used to tuck the edges of the sheet material into the groove.
FIGS. 7 and 7A is a cross-section view, an alternate embodiment showing two sheets having their edges tucked into a groove.

Thereafter, as shown in FIG. 5A, the blade 60 is lowered, the blade end 70 forcing the free edge 40 of the sheet downwardly into the groove. The unadhered portion of the free edge is not retained by engagement with the wall 26 of the groove because it is of minor width. The blade prevents possible curling of the free edge thereby presenting an unattractive seam. The blade and platen are maintained in engagement with the sheet for a time sufficient for the adhesive to be activated. Thereafter, the blade and platen are retracted and the carriage moved back to the first position.

In one application, the groove width was approximately 0.060 inch and the thickness of the edge 40 of the sheet 38 was about 0.040 inch. The platen 58 was preheated to about 200°–300° F., with 245°–250° F. being preferable. The preheated platen was lowered onto and held against the sheet 38 for about 30 seconds. The blade was lowered about ½ second after the platen to drive the sheet edge into the groove and maintained in position with the platen to drain heat from the platen and shield the panel from the heat.

The key to the method is selecting a temperature that is sufficient to transfer heat through the fabric to heat the adhesive to bond the sheet to the panel without disintegrating the fabric. The adhesive on the sheet portion corresponding to the inward extension of the lip is utilized as the sole means to retain the sheet edge in the groove. The blade acts as a shield to thermally separate the platen from the other wall of the groove, conducts heat through the blade material, and convects heat through the vertical air wall separating the blade from the other wall of the groove.

FIG. 6 discloses another embodiment according to this invention wherein, depending on the operating temperature to achieve a thermal bond, and the properties of the sheet material, the process may not require an insertion blade. Generally this would be suitable for lower temperature application wherein the blade is not needed to thermally shield the opposite wall of the groove. For example, polypropylene, which may deteriorate at temperatures higher than 240° F.

In this embodiment, a platen 72 having a peripheral lip 74 is all that is needed to press the sheet against the panel. The peripheral lip 74 is preferably continuous and adapted to extend substantially to the bottom of the groove, whereby almost all of the sheet adhesive up to the edge of the sheet will be activated by the platen and relied upon to adhere the sheet to the groove wall.

It should be noted that the appearance surface of the panel could include a contoured transition (e.g., a sloping portion), instead of a defined groove, wherein the platen would bond the free edge of the sheet to the contour. In such application, since the sheet edge would be exposed, the sheet would preferably be comprised of a material that does not fray.

FIGS. 7 and 7A disclose another embodiment according to this invention wherein two nontacky adhesively-backed sheets 76 and 78 of limp material are adapted to be adhered to the respective surface areas 80 and 82 of a panel 84 having a groove 86. For example, one sheet could be vinyl and the other sheet polymeric fabric. A first heated platen 88 has its peripheral lip 90 adapted to force the sheet 76 against the surface area 80 and into the groove, forcing a marginal edge portion of the sheet 76 against the wall 92 of the groove 86. A second heated platen 94 has its peripheral lip 96 adapted to force the second sheet 78 against the surface area 82 and into the groove, forcing a marginal edge portion of the sheet 78 against the other wall 98 of the groove 86. In this embodiment, the peripheral lips 90 and 96 are preferably continuous and the adhesive on the back of each sheet 76 and 78 is activated and relied upon to adhere the respective sheet to the panel.

Further, an insertion blade 100 is vertically inserted between the platen 88 and 94 to draw heat from each of the platen. As before, an air gap separates the opposite sides of the blade from each of the platen. The platen 88 and 94 would be lowered into pressed engagement with their respective sheets 76 and 78, followed by insertion of the blade 100. Advantageously, each platen 88 and 94 could be operated at different temperatures, depending in part on the adhesive and sheet material.

The combined thickness of the marginal free edge portions of the first and second sheets, are less than transverse width of the groove. That is, the marginal edge portions do not engage one another in the finished product to be retained in the groove but yet provide a seam which appears invisible.

While the above description constitutes the preferred embodiment of the invention, it will be appreciated that the invention is susceptible to modification, variation, and change without departing from the proper scope or fair meaning of the accompanying claims.

What is claimed is:

1. A combination of a vehicle body door upholstery panel, a movable heated platen, and a separately movable blade having opposite sides, the upholstery panel including a first sheet of flexible material and a support panel which includes an outer surface partitioned into contiguous first and second surface areas by a groove in the outer surface, the blade is spaced from the opposite wall of the groove by an air barrier, the blade shielding the opposite wall of the groove from exposure to heat from the platen.

2. The combination of claim 1, wherein the step of moving the platen further includes forcing the platen against the marginal end portion of the first sheet, such that the marginal end portion of the first sheet is urged against the one wall of the groove.

3. The combination of claim 2 wherein the blade includes opposite sides, and the forcing step includes advancing the blade vertically downwardly into the groove such that one side of the blade is adjacent to the free edge of the sheet and the other side is spaced from the opposite wall of the groove by an air barrier, the blade shielding the other wall of the groove from exposure to heat from the platen.

4. The combination of claim 1, wherein the heating step precedes the moving step.

5. The combination of claim 4, wherein the blade forcing step follows the platen moving step.

6. The combination of claim 5, wherein the support panel further includes a thin skin of polymeric material adhered onto an initially exposed surface of said support panel including said groove, such that said outer surface is defined by the thin skin, wherein the step of positioning the sheet follows the step of adhering said skin, said sheet formed from a fabric material.

7. The panel of claim 1, wherein the process further comprises the steps of:

adhesively coating one face of and cutting a second sheet of flexible material into a desired shape and having a marginal end terminating at free edge;

position the one face of said second sheet on the second of said contiguous surface areas such that the marginal end portion thereof is proximate to the other vertical wall of the groove;

moving a second platen into pressed engagement with the other face of said second sheet and maintaining the pressed engagement with the second surface area;

said first and second platens being preheated and moved substantially simultaneously against the respective sheets; and said blade substantially simultaneously forcing the free edge portions of the two sheets against the groove and forming respective air barriers for drawing the heat from each of the two platens away from the sheet material.

8. A combination of a vehicle body upholstery panel and a movable heat shield, produced by a process comprising the steps of:

providing a generally rigid unitary panel having top and bottom surfaces and an upwardly open vertical groove of predetermined depth penetrating into and partitioning the top surface into contiguous first and second surface areas, the groove including generally vertically directed first and second walls which confront one another and form a transition with respective first and second surface areas;

the groove having a width sufficient to accommodate at least a peripheral edge portion of a first upholstery sheet and the movable heat shield, as well as a peripheral edge portion of a second upholstery sheet if a second upholstery sheet is present;

positioning an adhesive-covered side of the first upholstery sheet on the panel such that a center portion of the first upholstery sheet is positioned on the first surface area and the peripheral edge portion overlaps the groove for insertion therein;

pressing the center portion of the sheet against the first surface area of the panel and the peripheral edge portion against the first wall of the groove;

inserting the heat shield into the groove between the first and second walls.

heat activating the adhesive-covered side of the first upholstery sheet, adhering said center and marginal portions of the sheet to said panel;

substantially simultaneously shielding the second wall from the heat while driving the peripheral edge portion of the first upholstery sheet not pressed against the first wall away from the second wall and towards the bottom of the groove; and maintaining the first upholstery sheet in heated and pressed engagement with the panel causing the sheet to firmly adhere to the panel.

\* \* \* \* \*

UNITED STATES PATENT AND TRADEMARK OFFICE
CERTIFICATE OF CORRECTION

PATENT NO. : 5,562,797
DATED : October 8, 1996
INVENTOR(S) : Phelps

It is certified that error appears in the above-identified patent and that said Letters Patent is hereby corrected as shown below:

<u>In the Title Page</u>, item [57],

Column 2, line 7, under "ABSTRACT", replace "potion" with --portion--.

<u>In the Claims</u>

In Claim 1, line 6, immediately after "surface," start a new paragraph as follows:

--the first sheet of flexible material attached to the outer surface in the first surface area and including a marginal end in the groove, the groove having a width large enough which accommodates at least the marginal end of the first sheet of flexible material and the movable blade, as well as a marginal end of a second sheet of material if a second sheet of material is attached to the outer surface in the second surface area, the combination produced by the process comprising the steps of:

coating one face of the sheet with a heat activatable adhesive;

cutting the sheet into a desired shape and having the marginal end terminating at a free edge;

UNITED STATES PATENT AND TRADEMARK OFFICE
CERTIFICATE OF CORRECTION

PATENT NO. : 5,562,797
DATED : October 8, 1996
INVENTOR(S) : Phelps

It is certified that error appears in the above-identified patent and that said Letters Patent is hereby corrected as shown below:

positioning the one face of said sheet onto the first surface area such that the marginal end of the sheet is proximate to one vertical wall of the groove;

moving the platen into engagement with the other face of the sheet to press the one face of the sheet against the first surface area;

heating the platen;

maintaining the heated platen in pressed engagement with the sheet for a time sufficient for the heat in the platen to activate the adhesive and for the adhesive to adhere to the first surface area; and       forcing the blade having opposing sides against the free edge portion of the first sheet and forcing the free edge portion of the first sheet downwardly and inwardly of the groove such that one side of the blade is adjacent to the free edge portion of the first sheet, the free edge portion is pressed against one wall of the groove, and the other side of--.

UNITED STATES PATENT AND TRADEMARK OFFICE
CERTIFICATE OF CORRECTION

PATENT NO. : 5,562,797
DATED : October 8, 1996
INVENTOR(S) : Phelps

It is certified that error appears in the above-identified patent and that said Letters Patent is hereby corrected as shown below:

In Claim 7, line 1, replace "panel" with --combination--.

In Claim 8, line 16, replace "." with --;--.

Signed and Sealed this

Ninth Day of June, 1998

*Attest:*

BRUCE LEHMAN

*Attesting Officer*  *Commissioner of Patents and Trademarks*